(12) United States Patent
Chang et al.

(10) Patent No.: US 11,389,970 B2
(45) Date of Patent: Jul. 19, 2022

(54) TOOL ADAPTER FOR MANIPULATING COMMERCIAL TOOLS WITH A ROBOT HAND

(71) Applicants: HANWHA DEFENSE CO., LTD., Changwon-si (KR); KYEONG IN TECH, Changwon-si (KR)

(72) Inventors: Seon Yong Chang, Changwon-si (KR); Sung Gyu Kim, Changwon-si (KR); Sang Min Kim, Changwon-si (KR); Yong Jun Choi, Changwon-si (KR)

(73) Assignees: HANWHA DEFENSE CO., LTD., Changwon-si (KR); KYEONG IN TECH, Changwon-si (KR)

( * ) Notice: Subject to any disclaimer, the term of this patent is extended or adjusted under 35 U.S.C. 154(b) by 366 days.

(21) Appl. No.: 16/635,896

(22) PCT Filed: Jul. 31, 2018

(86) PCT No.: PCT/KR2018/008688
§ 371 (c)(1),
(2) Date: Jan. 31, 2020

(87) PCT Pub. No.: WO2019/027228
PCT Pub. Date: Feb. 7, 2019

(65) Prior Publication Data
US 2021/0138664 A1    May 13, 2021

(30) Foreign Application Priority Data
Aug. 2, 2017 (KR) .................. 10-2017-0098052

(51) Int. Cl.
*B25J 15/04* (2006.01)
*B25F 5/02* (2006.01)
*B25J 15/00* (2006.01)

(52) U.S. Cl.
CPC ............ *B25J 15/04* (2013.01); *B25F 5/02* (2013.01); *B25J 15/0019* (2013.01)

(58) Field of Classification Search
CPC .......... B25J 15/04; B25J 15/0019; B25F 5/02; B23Q 3/155
(Continued)

(56) References Cited

U.S. PATENT DOCUMENTS 3,620,095 A * 11/1971 Dane .................... B25J 13/082
                                                     901/41
3,985,188 A * 10/1976 Steele ..................... B25G 1/04
                                                     30/296.1
(Continued)

FOREIGN PATENT DOCUMENTS

| KR | 10-0924481 B1 | 11/2009 |
| KR | 10-2013-0128672 A | 11/2013 |
| KR | 10-1384306 B1 | 4/2014 |

OTHER PUBLICATIONS

International Search Report dated Nov. 14, 2018 issued by the International Searching Authority in counterpart International Application No. PCT/KR2018/008688 (PCT/ISA/210).
(Continued)

*Primary Examiner* — Nathaniel C Chukwurah
*Assistant Examiner* — Lucas E. A. Palmer
(74) *Attorney, Agent, or Firm* — Sughrue Mion, PLLC

(57) ABSTRACT

Provided is a tool adapter mounted on a handle of a tool to be gripped by a robot hand, the tool adapter including: a fixing part including an opening in which the handle of the tool is inserted to be fixed to the fixing part; a grip part including contact surfaces which are installed on left and right sides of the fixing part to be gripped by the robot hand, and configured such that as at least one of the contact surfaces moves in accordance with a gripping force from the robot hand, a distance between the contact surfaces changes;
(Continued)

and a power transmission structure connected to the grip part and configured to convert a movement of the at least one of the contact surfaces into a movement of pressing a switch installed at the handle of the tool.

20 Claims, 11 Drawing Sheets

(58) Field of Classification Search
USPC .................................................. 173/170
See application file for complete search history.

(56) References Cited

U.S. PATENT DOCUMENTS

| | | | | |
|---|---|---|---|---|
| 4,132,318 A * | 1/1979 | Wang | ................. | B25J 9/0015 414/21 |
| 4,368,913 A * | 1/1983 | Brockmann | ......... | B25J 15/0266 294/203 |
| 4,370,091 A * | 1/1983 | Gagliardi | ................. | B25J 9/04 901/29 |
| 4,416,577 A * | 11/1983 | Inaba | ................. | B25J 19/0058 409/137 |
| 4,452,479 A * | 6/1984 | Terai | ................. | B25J 15/10 294/198 |
| 4,512,709 A * | 4/1985 | Hennekes | ............ | B25J 15/0491 901/41 |
| 4,561,506 A * | 12/1985 | Booker | ................. | B25J 9/146 901/41 |
| 4,620,362 A * | 11/1986 | Reynolds | ................. | B25J 15/04 414/730 |
| 4,621,852 A * | 11/1986 | Maki | ................. | B25J 15/10 294/81.62 |
| 4,685,850 A * | 8/1987 | Ohta | ................. | B25J 15/0491 198/465.1 |
| 4,699,414 A * | 10/1987 | Jones | ................. | B25J 15/026 294/902 |
| 4,784,421 A * | 11/1988 | Alvite' | ................. | B25J 19/063 294/119.1 |
| 4,830,569 A * | 5/1989 | Jannborg | ............. | B25J 19/0041 901/41 |
| 5,361,851 A * | 11/1994 | Fox | ................. | B25F 5/021 30/296.1 |
| 5,626,457 A * | 5/1997 | Hickman, Jr. | ........... | B25J 9/046 173/185 |
| 6,113,343 A * | 9/2000 | Goldenberg | ........... | B25J 19/005 239/587.2 |
| 6,569,070 B1 * | 5/2003 | Harrington | ............. | B25J 15/04 901/41 |
| 6,904,687 B1 * | 6/2005 | Hill, Sr. | ................. | A01G 3/086 30/296.1 |
| 7,228,917 B2 * | 6/2007 | Davis | ................. | B25F 5/021 30/296.1 |
| 7,237,707 B1 * | 7/2007 | Wakelin | ................. | B25C 7/00 173/171 |
| 7,258,261 B1 * | 8/2007 | Reyes | ................. | B25C 7/00 227/156 |
| 7,828,075 B2 * | 11/2010 | Daniel | ................. | G21F 9/305 173/184 |
| 8,905,687 B2 * | 12/2014 | Blatz | ................. | B25F 5/021 408/136 |
| 9,044,836 B2 * | 6/2015 | Blatz | ................. | B23Q 9/00 |
| 10,272,575 B2 * | 4/2019 | Pedersen | ............. | B25J 15/0483 |
| 10,286,566 B2 * | 5/2019 | Williams | ............. | B25J 19/0033 |
| 2003/0168491 A1 * | 9/2003 | Goodwin | ................. | B25C 7/00 227/147 |
| 2004/0142803 A1 | 7/2004 | Fitzgibbon | | |
| 2005/0000713 A1 * | 1/2005 | Pourtler | ................. | B25C 7/00 173/29 |
| 2008/0073922 A1 * | 3/2008 | Holtz | ................. | B25J 15/0213 901/1 |
| 2010/0068024 A1 | 3/2010 | Agens | | |
| 2010/0095799 A1 * | 4/2010 | Albin | ................. | B25J 15/0213 901/31 |
| 2010/0164243 A1 * | 7/2010 | Albin | ................. | B66F 9/065 74/425 |
| 2011/0313559 A1 * | 12/2011 | Aviza | ................. | B25J 11/005 700/110 |
| 2012/0043100 A1 * | 2/2012 | Isobe | ................. | A61B 17/1631 901/41 |
| 2012/0126560 A1 * | 5/2012 | Ockleston | ............ | B25F 5/021 294/209 |
| 2012/0284997 A1 * | 11/2012 | Morin | ................. | H01R 11/14 294/174 |
| 2012/0299322 A1 * | 11/2012 | White | ................. | B25J 15/0475 294/213 |
| 2013/0313791 A1 * | 11/2013 | Setrakian | ............. | B25J 15/0433 279/143 |
| 2016/0263738 A1 * | 9/2016 | May | ................. | B25H 1/0057 |
| 2016/0303730 A1 * | 10/2016 | Carvajal | ............. | B25B 23/0071 |
| 2018/0009096 A1 * | 1/2018 | Grazioli | ................. | B25C 1/008 |
| 2018/0021902 A1 * | 1/2018 | De Mattia | ............ | B25J 15/0095 173/31 |
| 2018/0065208 A1 * | 3/2018 | Mori | ................. | B23Q 3/15513 |
| 2018/0126541 A1 * | 5/2018 | Jeremenko | ............. | B25B 21/00 |
| 2018/0207762 A1 * | 7/2018 | Kawabe | ............. | B23Q 11/0075 |
| 2019/0358830 A1 * | 11/2019 | Nishio | ................. | B25J 15/0433 |

OTHER PUBLICATIONS

Written Opinion dated Nov. 14, 2018 issued by the International Searching Authority in counterpart International Application No. PCT/KR2018/008688 (PCT/ISA/237).

Communication dated Oct. 12, 2021 by the Korean Intellectual Patent Office in counterpart Korean Patent Application No. 10-2017-0098052.

\* cited by examiner

TOOL ADAPTER FOR MANIPULATING COMMERCIAL TOOLS WITH A ROBOT HAND

CROSS-REFERENCE TO THE RELATED APPLICATION

This application is a National Stage of International Patent Application No. PCT/KR2018/008688 filed on Jul. 31, 2018, and claims priority from Korean Patent Application No. 10-2017-0098052 filed on Aug. 2, 2017, the disclosures of which are hereby incorporated by reference in their entireties.

BACKGROUND

Apparatus and methods consistent with exemplary embodiments of the inventive concept relate to an adapter mounted on a tool, and more particularly, an adapter between a tool, such as a gun-type commercial tool, and a robot hand.

With the development of robotic technology, it is becoming common to perform tasks using robots at work sites. Robots are fixedly mounted on work equipment lines to carry out tasks, or are deployed at dangerous work sites to remotely perform tasks, such as removing explosives. Also, robots may repeatedly perform one task or alternately perform various types of tasks.

Examples of a variety of tasks performed by robots include cutting, drilling and hammering (hereinafter, "the cutting operation"). In order for robots to perform the cutting operation, dedicated tools that fit the mechanical/electrical interfaces of the robots are mounted on the robots. Drilling is performed using a robot with a dedicated tool equipped with a drill, and hammering is performed by mounting a dedicated tool equipped with a hammer on the robot.

However, the following problems may arise. First, the cost of providing dedicated tools for robots is incurred. There already exist commercial tools for the cutting operation such as cutters, drills, and hammers. To provide additional tools for robots without using such commercial tools incurs additional costs. Second, compatibility is required between dedicated tools and robots. A dedicated tool for one robot may not be able to be used for other robots because it does not fit the mechanical/electrical interfaces of the other robots. Third, the replacement of dedicated tools needs to be performed by users. However, when robots are deployed in dangerous work sites with risk factors, it may be difficult to manually replace dedicated tools for the robots. Thus, the robots are required to return from the work sites to have their dedicated tools replaced with other tools that fit their mechanical/electrical interfaces.

U.S. Pat. No. 4,620,362 (hereinafter, "the '362 patent") discloses a device that can manipulate a variety of tools with the gripping fingers of a robot. Specifically, the '362 patent causes deformation appropriate for each tool, mounts interface devices on the gripping fingers of the robot and on a tool, and operates the tool via electrical signals between the interface devices. However, since the '362 patent uses electrical signals to operate the tool, a considerable amount of deformation needs to be caused to the gripping fingers of the robot and to the tool, and for a proper electrical interface between the gripping fingers of the robot and the tool, the tool needs to be mounted at the gripping fingers by a user. Also, the '362 patent requires installation of different interfaces for different types of tools which may deteriorate compatibility.

U.S. Patent Application No. 2010/0068024 (hereinafter, "the 024 application") suggests a system that can allow a robot to replace tools in a remote work site. According to the '024 application, a gripper block is mounted on each tool so that the gripper fingers of a robot can grasp the gripper block to use each tool. However, since tools for use disclosed in the '024 application are non-electrical tools, such as hammers or the like, that operate non-electrically, the range of tools that can be used is limited, and the '024 application is not applicable to tools that operate electrically.

Therefore, a tool adapter that can manipulate various types of commercial tools with a robot hand is suggested.

Exemplary embodiment of the inventive concept provide a tool adapter capable of manipulating various commercial tools using a robot hand.

The embodiments also provide a tool adapter that is compatible with, and can thus be mounted on, various types of commercial tools.

The embodiments further provide a tool adapter that enables to replace a commercial tool currently being used by a robot hand at a remote work site with another commercial tool.

Various aspects of the embodiments will be set forth in part in the description which follows and in part will become apparent to those having ordinary skill in the art upon examination of the following or may be learned from practice of the embodiments.

According to an aspect of the embodiments, there is provided a tool adapter mounted on a handle of a tool to be gripped by a robot hand which may include: a fixing part including an opening in which the handle of the tool is inserted to be fixed to the fixing part; a grip part including contact surfaces which are installed on left and right sides of the fixing part to be gripped by the robot hand, and configured such that as at least one of the contact surfaces moves in accordance with a gripping force from the robot hand, a distance between the contact surfaces changes; and a power transmission structure connected to the grip part and configured to convert a movement of the at least one of the contact surfaces into a movement of pressing a switch installed at the handle of the tool.

According to another aspect of the embodiments, there is provided a tool adapter mounted on a handle of a tool to be gripped by a robot hand which may include: a fixing part including an opening in which the handle of the tool is inserted to be fixed to the fixing part; a power transmission structure coupled to the fixing part and pressing a switch of the tool by transmitting an external force, that results from a movement of the robot hand, to the switch of the tool; and a grip part coupled to the fixing part and the power transmission mechanism and including contact surfaces which are gripped by the robot hand, wherein the fixing part and the power transmission structure are coupled to the grip part to be rotatable with respect to the grip part in accordance with the external force.

Other details of the embodiments, as well as other advantages attendant thereto, are set forth in the following detailed description and the accompanying drawings.

Embodiments of the present invention have at least the following advantageous effects.

Since tasks can be performed using existing robots and commercial tools, the cost of fabricating any dedicated tools can be reduced.

In addition, the tool adapter according to the present invention is compatible with, and applicable to, various types of commercial tools.

Moreover, since the tool adapter according to the present invention does not require any mechanical/electrical interface with a robot hand, a robot can perform tasks at a remote work site by replacing tools itself.

It is to be understood that the advantages according to the present invention are not limited to those set forth herein, and any other advantages which are not described will be apparent from the detailed description of the present invention to those skilled in the art to which the present invention pertains.

DETAILED DESCRIPTION

Figure 1:
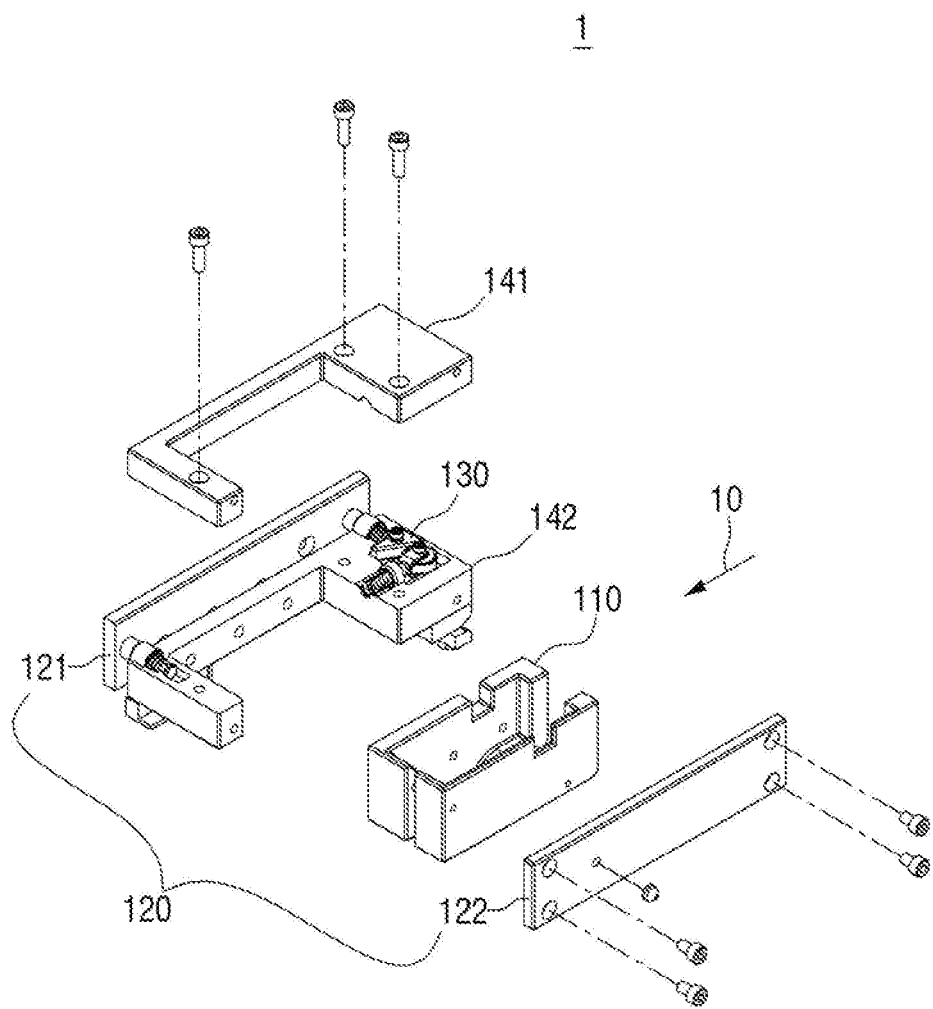
FIG. 1 is an exploded perspective view of a tool adapter according to an embodiment.

The inventive concept will be made clear from various exemplary embodiments described below in detail with reference to the accompanying drawings. The embodiments described herein are all exemplary. The inventive concept may be embodied in many different forms and should not be construed as being limited to the embodiments set forth herein. Rather, these embodiments are provided such that this disclosure will be thorough and complete, and will fully convey the scope of the inventive concept to those skilled in the art. The inventive concept is merely defined by the scope of the claims. Like reference numerals refer to like elements throughout the specification.

Unless otherwise defined, all terms (including technical and scientific terms) used herein have the same meaning as commonly understood by one of ordinary skill in the art to which this embodiments belong. The terms, such as those defined in commonly used dictionaries, should be interpreted as having a meaning that is consistent with their meaning in the context of the relevant art, and should not be interpreted in an idealized and/or overly formal sense unless expressly so defined herein.

The terminology used herein is for the purpose of describing particular embodiments only and is not intended to be necessarily limiting of the disclosure. As used herein, the singular forms "a," "an" and "the" are intended to include the plural forms as well, unless the context clearly indicates otherwise. The terms "comprises" and/or "comprising" when used in this specification, specify the presence of stated features, integers, steps, operations, elements, and/or components, but do not preclude the presence or addition of one or more other features, integers, steps, operations, elements, components, and/or groups thereof.

Furthermore, relative spatial terms may be used herein to describe one element's relationship to another element as illustrated in the accompanying drawings. Such relative spatial terms are intended to encompass different orientations of illustrated technologies in addition to the orientation depicted in the accompanying drawings.

It will be understood that when an element or layer is referred to as being "over," "above," "on," "connected to" or "coupled to" another element or layer, it can be directly over, above, on, connected or coupled to the other element or layer or intervening elements or layers may be present. In contrast, when an element is referred to as being "directly over," "directly above," "directly on," "directly connected to" or "directly coupled to" another element or layer, there are no intervening elements or layers present. Like numerals refer to like elements throughout. As used herein, the term "and/or" includes any and all combinations of one or more of the associated listed items.

The embodiments will hereinafter be described with reference to the accompanying drawings.

FIG. 1 is an exploded perspective view of a tool adapter 1 according to an embodiment. FIG. 1 illustrates elements of the tool adapter 1. The tool adapter 1 includes a fixing part 110, a grip part 120, a power transmission structure 130, a top cover 141, and a bottom cover 142. An arrow 10 of FIG. 1 indicates the front of the tool adapter 1.

The fixing part 110 is an element to be mounted on the handle of a tool. The fixing part 110 includes an opening that vertically penetrates the fixing part 110, and the handle of the tool may be fixed by being inserted in the opening of the fixing part 110. According to an embodiment, the fixing part 110 may be configured to be assembled to surround and thereby fix the handle of a tool.

Inner side surfaces of the fixing part 110 may be formed of a filler material with a restoring force so that the tool adapter 1 can be used for various types of tools. According to an embodiment, the inner side surfaces of the fixing part 110 may be formed in a shape that corresponds to a circumferential shape of the handle of a tool.

If a filler material is used on an inside of the fixing part 110, various types of tools can be inserted into the fixing part 110. Thus, the tool adapter 1 can be mounted on various types of tools.

Even if the inner side surfaces of the fixing part 110 are formed in a shape that corresponds to the circumferential shape of the handle of a tool, compatibility between the fixing part 110 and other parts of the tool adapter 1 can be maintained, as long as outer side surfaces of the fixing part 110 are formed in a particular shape, because the other parts of the tool adapter 1 are connected to the outside of the fixing part 110. Thus, since only the fixing part 110 can be changed in accordance with the circumferential shape of the handle of a tool, compatibility of the tool adapter 1 with various types of tools is not lost in general.

The grip part 120 may be an element to be gripped by a robot hand. The grip part 120 includes contact surfaces installed on left and right sides of the fixing part 110 so that the robot hand can grip the grip part 120. When the robot hand grips the contact surfaces and applies a gripping force, at least one of the contact surfaces is moved by the gripping force so that the distance between the contact surfaces may change. A portion of the grip part 120 that contacts a left contact surface of the fixing part 110 will hereinafter be referred to as a first grip part 121, and a portion of the grip part that contacts a right contact surface of the fixing part 110 will hereinafter be referred to as a second grip part 122.

The power transmission structure 130 is an element that transmits the gripping force from the robot hand to a switch installed at the handle of a tool. When at least one of the contact surfaces of the grip part 120 is moved by the gripping force from the robot hand, the power transmission structure 130 may convert the movement of the contact surface(s) into the movement of pressing the switch of the tool.

The tool adapter 1 may selectively include the top cover 141 and/or the bottom cover 142. The top cover 141 and the bottom cover 142 are elements that house the power transmission structure 130 to protect the power transmission structure 130. The top cover 141 and the bottom cover 142 may be formed in a C shape to properly house the power transmission structure 130 without covering the opening of the fixing part 110. In the embodiment of FIG. 1, the tool adapter 1 may include both the top cover 141 and the bottom cover 142.

A recess corresponding to a shape of the power transmission structure 130 may be formed on the bottom surface of the top cover 141 to house the power transmission structure 130. According to an embodiment, a recess may be formed on the top surface of the bottom cover 142 to correspond to the shape of the power transmission structure 130. According to an embodiment, recesses may be formed on both the bottom surface of the top cover 141 and the top surface of the bottom cover 142 to correspond to the shape of the power transmission structure 130. In the embodiment of FIG. 1, a recess corresponding to the shape of the power transmission structure 130 is mounted on a top surface of the bottom cover 142, and the power transmission structure 130 is inserted in the recess.

It will hereinafter be described with reference to FIG. 2 how to mount the tool adapter 1 on the handle of a tool.

Figure 2:
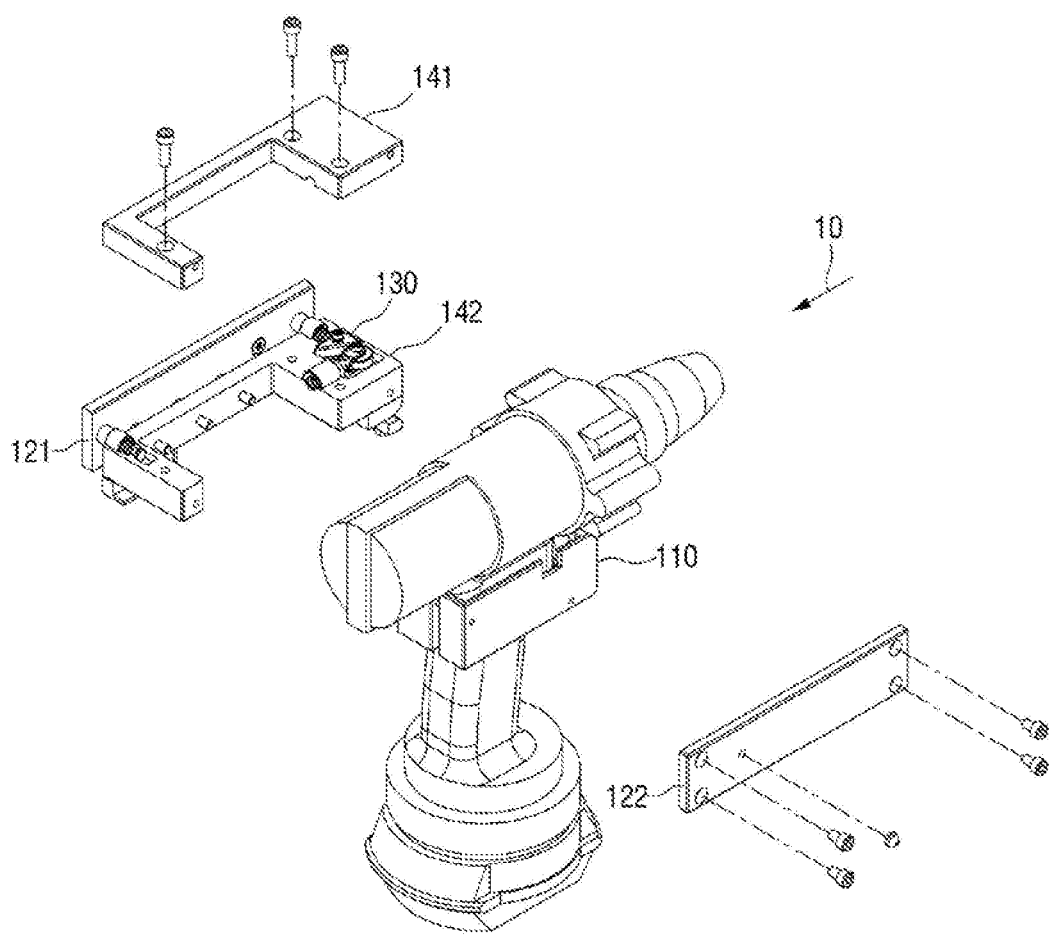
FIG. 2 is an exploded perspective view illustrating a tool adapter with a fixing part mounted on a handle of a tool, according to an embodiment.

FIG. 2 is an exploded perspective view illustrating the tool adapter 1 with the fixing part 110 mounted on the handle of a tool. Here, the tool where the tool adapter 1 is mounted may have a battery embedded therein, and may be a gun-type commercial tool. An arrow 10 of FIG. 2 indicates the front of the tool adapter 1.

First, the fixing part 110 is mounted on the handle of the tool to surround part of the tool where a switch is located. As already described above with reference to FIG. 1, the fixing part 110 may be mounted on the handle of the tool by inserting the handle of the tool in the opening of the fixing part 110 or assembling the fixing part 110 to surround the handle of the tool.

The first grip part 121 may be coupled to the power transmission structure 130. It will hereinafter be described with reference to FIG. 4 how the first grip part 121 and the power transmission structure 130 are coupled together.

Figure 4:
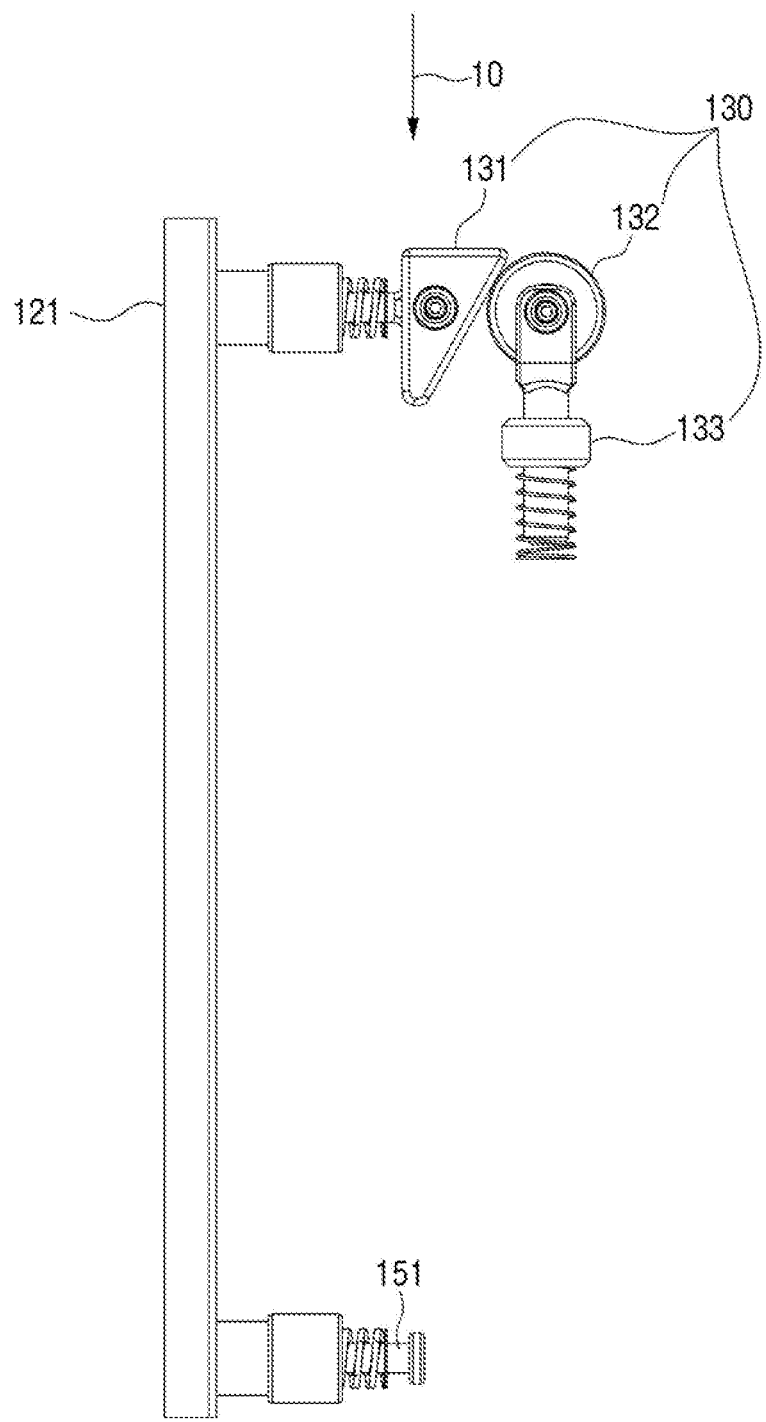
FIG. 4 is a plan view illustrating a first grip part and a power transmission structure of the tool adapter, according to an embodiment.

FIG. 4 is a plan view illustrating the first grip part 121 and the power transmission structure 130 of the tool adapter 1 according to an embodiment. An arrow 10 of FIG. 4 indicates the front of the tool adapter 1.

The power transmission structure 130 includes a first push rod 131, a direction changer 132, and a second push rod 132. The first push rod 131 is an element that transmits the gripping force from the robot hand to the direction changer 132. The direction changer 132 is an element that changes a direction of the gripping force transmitted by the first push rod 131 into a vertical direction. The second push rod 133 is an element that is positioned vertically with respect to the first push rod 131, and transmits the gripping force whose direction is changed into the vertical direction by the direction changer 132 to the switch of the tool. The operating principles of the power transmission structure 130 will be described later with reference to FIGS. 5 and 6.

The first push rod 131, among elements of the power transmission structure 130, is coupled to the first grip part 121. The first push rod 131 is coupled such that an end thereof is fixed to the first grip part 121, in which case, the first push rod 131 is coupled to one end of the first grip part 121 on a front side of the tool adapter 1. This is to place an end of the second push rod 133 at a front of the switch of the tool when all elements of the tool adapter 1 are assembled.

In a case where the first grip part 121 is moved to the right by the gripping force from the robot hand, the first push rod 131 may be moved to the right together with the first grip part 121 because it is fixed to the first grip part 121. Since the first push rod 131 is coupled to the end of the first grip part 121 on the front side of the tool adapter 1, the first push rod 131 may be moved to the right of the first grip part 121 without having the first and second grip parts 121 and 122 become parallel to each other. In order to prevent this, a third push rod 151 may be coupled to the other end of the first grip part 121. For example, the third push rod 151 may be coupled to the other end of the first grip part 121 to be symmetrical with the first push rod 131.

It will be described hereinafter with reference again to FIG. 2 how the elements of the tool adapter 1 are assembled. The power transmission structure 130, which is connected to the first grip part 121, may be mounted on the bottom cover 142. The top cover 141 is assembled to a top of the bottom cover 142 where the power transmission structure 130, which is connected to the first grip part 121, is mounted, so that the top surface of the bottom cover is placed in contact with a bottom surface of the top cover 141. The top cover 141 and the bottom cover 142 that are assembled together are coupled to the left side of the fixing part 110 so that the fixing part 110 can be fitted in the C-shaped groove, and lastly, the second grip part 122 is coupled to the top cover 141, the bottom cover 142, and the right side of the fixing part 110.

Once the tool adapter 1 is assembled to surround the switch of the handle of the tool, the end of the second push rod 133 of the tool adapter 1 is located at the front of the switch of the tool. An opening may be formed at the front of the fixing part 110 so that the second push rod 133 of the power transmission structure 130 can be in contact with the switch of the tool. The opening may be formed in a shape of a hole or a gap.

It will hereinafter be described with reference to FIG. 3 how the tool adapter 1 assembled to the handle of the tool is gripped by the robot hand.

Figure 3:
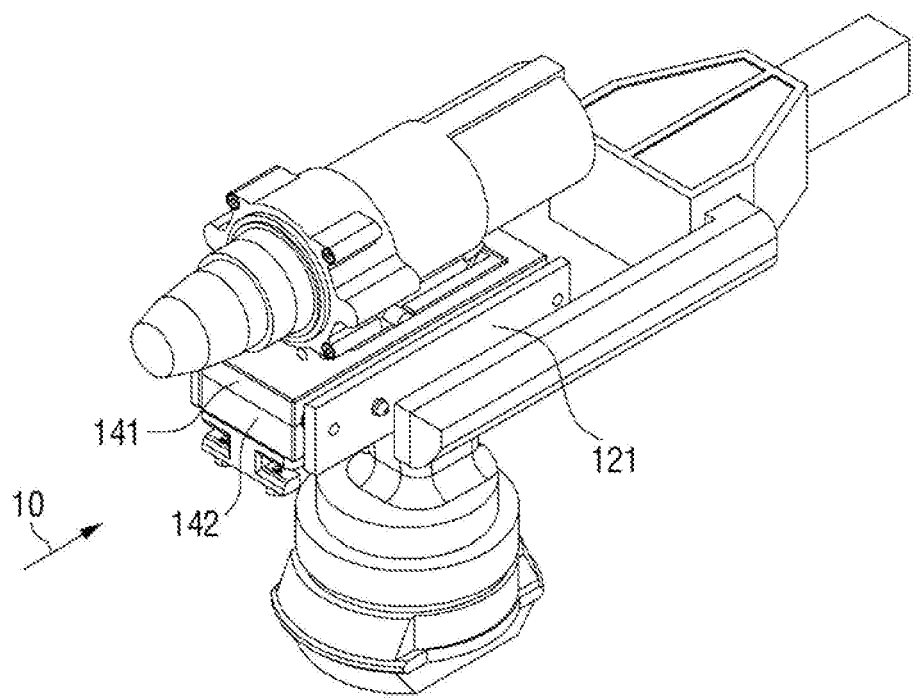
FIG. 3 is a front perspective view illustrating a robot hand that grips the tool adapter, according to an embodiment.

FIG. 3 is a front perspective view illustrating a robot hand that grips the tool adapter 1 according to an embodiment. An arrow 10 of FIG. 3 indicates the front of the tool adapter 1.

The robot hand that grips the tool adapter 1 according to an embodiment may be a robot hand with at least two fingers. FIG. 3 illustrates an example in which the robot hand is a set of parallel tongs with two parallel fingers. The robot hand that grips the tool adapter 1 does not necessarily include the parallel tongs and may be a set of angled tongs with two fingers that form an acute angle, and the shape of the robot hand is not particularly limited as long as the robot hand can properly grip the tool adapter 1.

Referring to FIG. 3, the robot hand grips a left contact surface of the first grip part 121 and a right contact surface of the second grip part 122, as viewed from the front of the tool adapter 1. These contact surfaces may be formed of a material having a friction force, such as, for example, a rubber material, so that the robot hand does not slip thereon. According to an embodiment, in a case where one or more protrusions are formed on the tongs of the robot hand, at least one recess or hole may be formed on the contact surfaces of the first grip part 121 and the second grip parts 122 to correspond to a shape of the protrusions. According to an embodiment, in a case where one or more recesses or holes are formed on the tongs of the robot hand, at least one protrusion may be formed on the contact surfaces of the first grip part 121 and the second grip parts 122 to correspond to the shape of the recesses or holes.

As the robot hand applies a gripping force to the contact surfaces by reducing a distance between the parallel tongs thereof, at least one of the contact surfaces moves in a direction parallel to the gripping force, and the power transmission structure 130 operates the tool by converting the movement of the corresponding contact surface(s) into the movement of pressing the switch of the tool.

According to an embodiment, since the robot hand is simply supposed to grip the grip part 120 of the tool adapter 1 to operate the tool, no particular mechanical/electrical interface is needed between the tool adapter 1 and the robot hand. Accordingly, a robot can replace tools itself at a remote work site by using the tool adapter 1 according to present embodiment.

It will hereinafter be described with reference to FIGS. 5 and 6 how to operate the tool with the gripping force from the robot hand.

Figure 5:
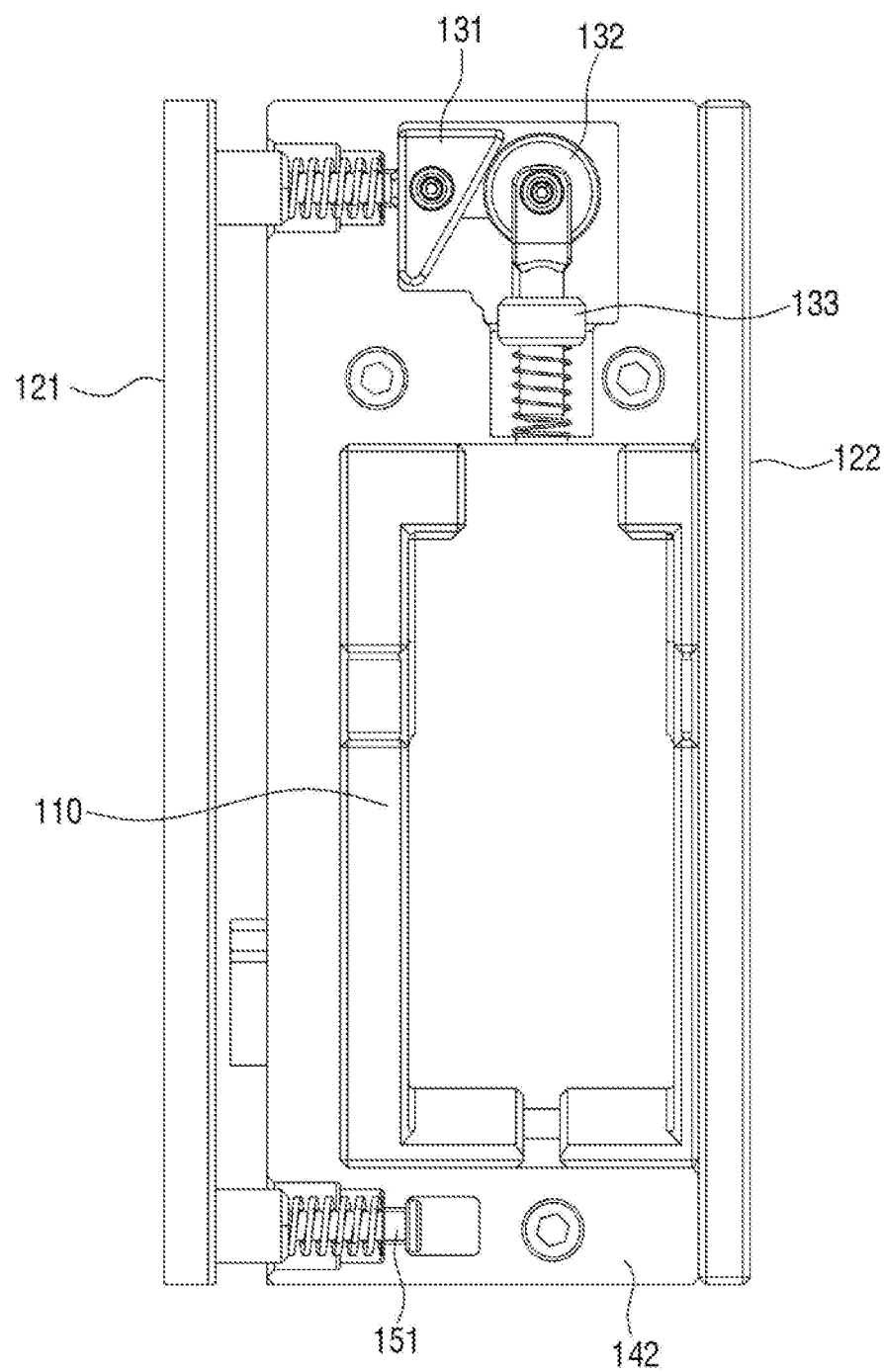
FIG. 5 is a plan view illustrating a tool adapter with a gripping force yet to be applied thereto by a robot hand, according to an embodiment.
Figure 6:
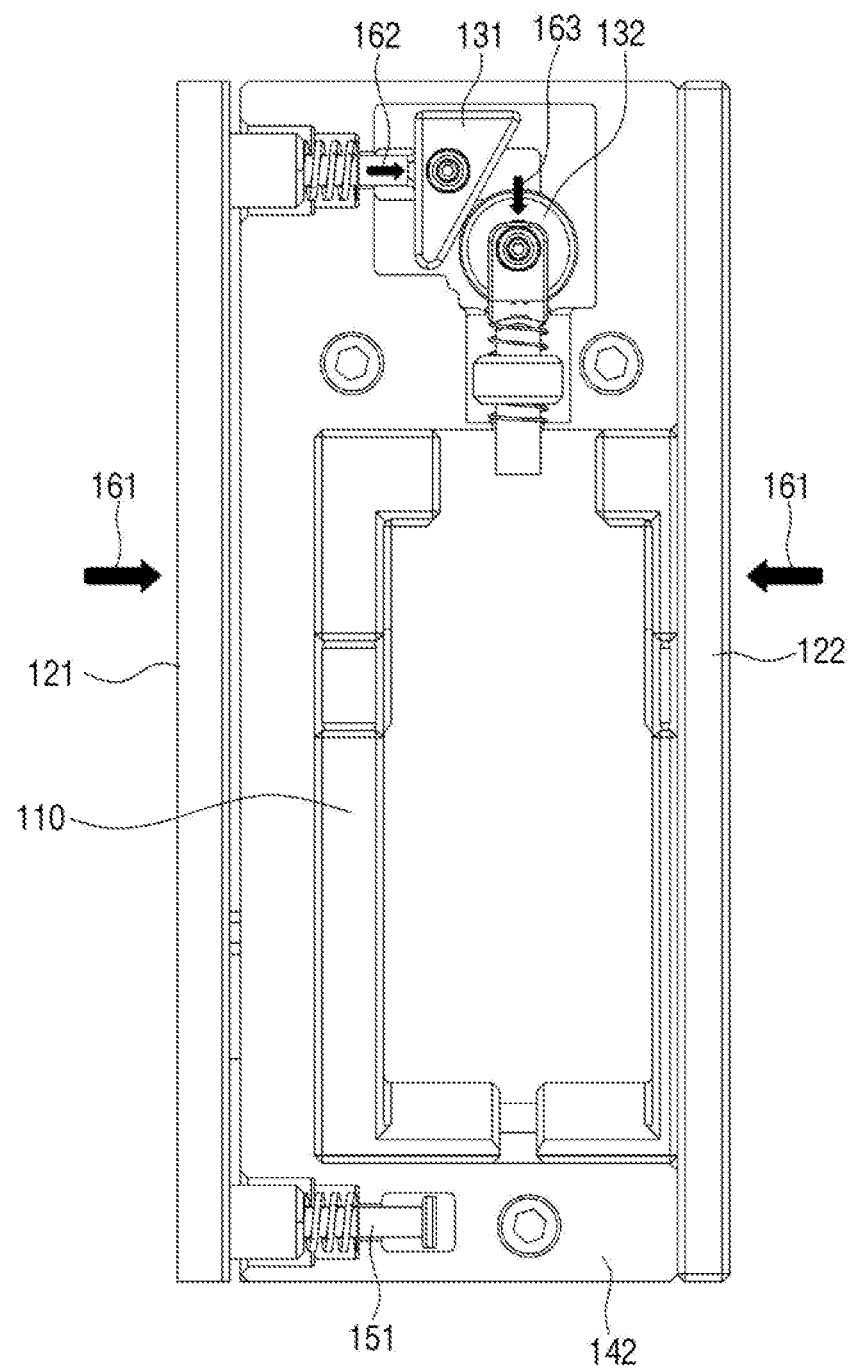
FIG. 6 is a plan view illustrating a tool adapter to which a gripping force is being applied by a robot hand, according to an embodiment.

FIGS. 5 and 6 are plan views illustrating the entire tool adapter 1 except the top cover 141. Specifically, FIG. 5 is a plan view illustrating the tool adapter 1 according to an embodiment with a gripping force yet to be applied thereto by the robot hand, and FIG. 6 is a plan view illustrating the tool adapter 1 according to an embodiment to which a gripping force is being applied by the robot hand.

Referring to FIGS. 5 and 6, when the robot hand applies a gripping force 161 to the grip part 120, the first grip part 121 moves to the right so that the distance between the first and second grip parts 121 and 122 decreases. The first grip part 121 may move to the right to be parallel to the second grip part 122 due to the first and third push rods 131 and 151.

The first push rod 131 of the power transmission structure 130 may move to the right (162) together with the first grip part 121 to transmit the gripping force 161, applied from the robot hand to the first grip part 121, to the direction changer 132. A wedge-type block may be formed at an end of the first push rod 131 that is in contact with the direction changer 132.

The direction changer 132 converts the direction of the received gripping force 161 into the vertical direction. The direction changer 132 may include a circular wheel that is rotatably supported by the second push rod 133. As an inclined surface of the wedge-type block of the first push rod 131 pushes the circular wheel of the direction changer 132 due to the gripping force 161 from the robot hand, the circular wheel rotates along the inclined surface of the wedge-type block and thus moves in the vertical direction (163) with respect to the gripping force 161.

Since one end of the second push rod 133 is connected to the direction changer 132, the second push rod 133 moves in the vertical direction as the circular wheel moves in the vertical direction. Since another end of the second push rod 133 is directed to the tool to face the front of the switch of the tool, the second push rod 133 presses the switch of the tool as the other end of the second push rod 133 moves in the vertical direction.

The second push rod 133 may transmit the gripping force 161 to the switch by directly pressing the switch. According to an embodiment, there may exist an object between the second push rod 133 and the switch, in which case, if the other end of the second push rod 133 applies a force to the object, the object may transmit the gripping force 161 to the switch by pressing the switch.

The tool adapter 1 may include springs that surround the first push rod 131, the second push rod 133, and the third push rod 151 so that the first grip part 121 and the power transmission structure 130 can return to their initial positions when the gripping force 161 from the robot hand is removed. If the robot hand spreads its tongs that apply the gripping force 161, the first, second, and third push rods 131, 133, and 151 return to their initial positions due to the springs, and as a result, the first grip part 121, which is coupled to the first and third push rods 131 and 151, also returns to its initial position.

However, the springs may not necessarily be essential to return the first, second, and third push rods 131, 133, and 151 to their initial positions, and various other resilient structures can also be used.

According to the aforementioned operating principles, the tool adapter 1 can turn on the switch of the tool using the gripping force 161 from the robot hand. Also, the tool adapter 1 can adjust operating stages of the tool by changing a force with which the second push rod 133 presses the switch.

FIGS. 5 and 6 illustrate that the first and third push rods 131 and 151 of the power transmission structure 130 are coupled to the first grip part 121, but according to an embodiment, the first and push rods 131 and 151 may be coupled to the second grip part 122 so that the second grip part 122 can move in accordance with a gripping force. According to an embodiment, the first and third push rods 131 and 151 may be coupled to the first grip part 121, and other push rods may be coupled to the second grip part 122. In which case, the first and second grip parts 121 and 122 may both move in accordance with a gripping force.

Also, FIGS. 5 and 6 illustrate that the end of the first push rod 131 of the tool adapter has the shape of a the wedge-type block, and that the direction changer 132 includes the circular wheel and converts the direction of a gripping force into the vertical direction, but according to an embodiment, various other structures capable of converting the direction of a gripping force into the vertical direction can also be used. For example, the first push rod 131 and the direction changer 132 are linked by a fixing pin so that as the first push rod 131 pushes the direction changer 132, the direction changer 132 rotates with respect to the fixing pin to push the second push rod 133 in the vertical direction and thus to convert the direction of a gripping force into the vertical direction. According to an embodiment, the first push rod 131 may have a stepped shape so that as the first push rod 131 pushes the circular wheel of the direction changer 132, the circular wheel moves in the vertical direction along the steps of the first push rod 131 to convert the direction of a gripping force into the vertical direction.

The tool adapter 1 according to the above embodiment operates a tool with the use of a gripping force with which a robot hand grips the gripping part 120. In the above embodiment, the force that the tongs of the robot hand directly applies to the tool adapter is used. A tool adapter that can operate a tool using an external force indirectly applied thereto by a robot hand will hereinafter be described.

Figure 7:
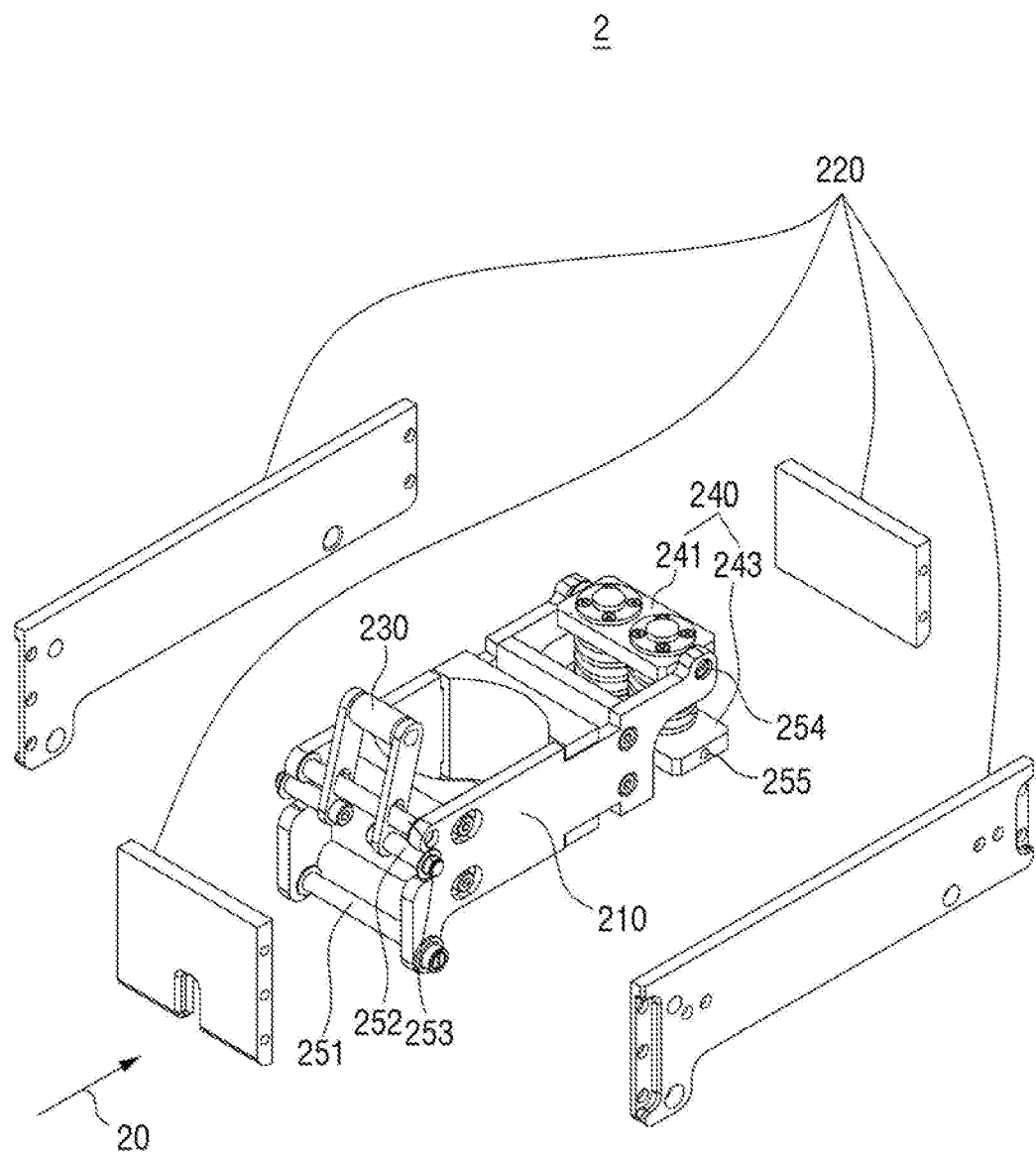
FIG. 7 is an exploded perspective view of a tool adapter according to an embodiment.

FIG. 7 is an exploded perspective view of a tool adapter 2 according to an embodiment. FIG. 7 illustrates elements of the tool adapter 2. The tool adapter 2 includes a grip part 220, a fixing part 210, a power transmission structure 230, and a stopper 240. An arrow 20 of FIG. 7 indicates a front of the tool adapter.

The grip part 220 is an element to be gripped by a robot hand. The grip part 220 includes outer walls that surround the fixing part 210, the power transmission structure 230, and the stopper 240. The outer walls of the grip part 220 may preferably, but not necessarily, be formed of a rigid material that does not change even if a gripping force is applied from a robot hand. Among the outer walls of the grip part 220, two walls that are opposite to each other in a left-to-right direction with respect to the front of the tool adapter 2 may be planes that are parallel to each other to be able to be easily gripped by the robot hand.

The fixing part 210 is an element to be mounted on a handle of a tool. The fixing part 210 includes an opening that vertically penetrates the fixing part 210, and the handle of the tool may be fixed by being inserted in the opening of the fixing part 210.

Two inner side surfaces of the fixing part 210 that face each other in a first direction may be in the shape of planes. Other two inner side surfaces of the fixing part 210 that face each other in a second direction and intersect the two inner side surfaces that face each other in the first direction may be recessed to facilitate insertion of the handle of the tool. The first and second directions may be the left-to-right direction and a front-to-rear direction, respectively, with respect to the front 20 of the tool adapter 2.

Front lower portions of sides of the fixing part 210 is fixed to front lower portions of sides of the grip part 220 by a first fixing pin 251. In this case, the fixing part 210 may be rotatably fixed by the first fixing pin 251 to be able to rotate about the first fixing pin 251, freely from the grip part 220, while maintaining a predetermined distance from the grip part 220.

The power transmission structure 230 is an element that presses a switch installed at the handle of the tool. One end of the power transmission structure 230 is fixed to front upper portions of the sides of the grip part 220 by a second fixing pin 252. One point between the one end and another end of the power transmission structure 230 is connected to the front upper portions of the sides of the fixing part 210 by a connecting pin 253. The connection pin 253 may preferably connect the power transmission structure 230 and the fixing part 210 so that the power transmission structure 230 and the fixing part 210 can be located on the upper rear side of the second fixing pin 252. This is to tilt the power transmission structure 230 so that the other end of the power transmission structure 230 faces a front of the switch of the tool mounted on the fixing part 210, and that the power transmission structure 230 can easily press the switch.

The stopper 240 is an element that controls an angle of rotation of the fixing part 210 about the first fixing pin 251. The stopper 240 includes a stopper moving plate 241, a stopper fixed plate 243, and a stopper central shaft 242. The stopper 240 may include at least one stopper central shaft 242. FIG. 7 illustrates that the stopper 240 includes two stopper central shafts 242.

The stopper moving plate 241 is fixed to rear upper portions of the sides of the fixing part 210 by a third fixing pin 254. The stopper fixed plate 243 is fixed to rear lower portions of the sides of the grip part 220 by a fourth fixing pin 255. The stopper moving plate 2421 is connected to the fixing part 210, and the stopper fixed plate 243 is connected to the grip part 220. Thus, when the fixing part 210 rotates about the first fixing pin 251, the stopper moving plate 241 can move along with the fixing part 210 with the stopper fixed plate 243 fixed.

It will hereinafter be described with reference to FIG. 8 how the tool adapter according to another embodiment is mounted on the handle of a tool.

Figure 8:
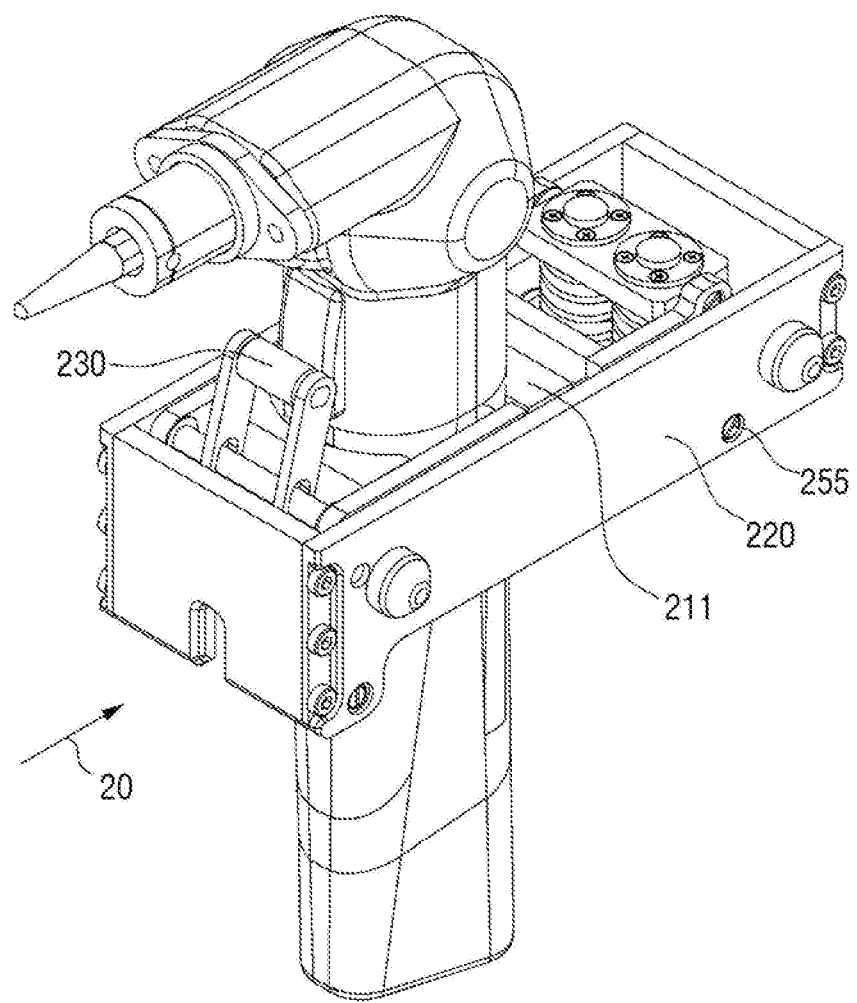
FIG. 8 is a front perspective view illustrating a tool adapter mounted on a handle of a tool, according to an embodiment.

FIG. 8 is a front perspective view illustrating the tool adapter 2 according to another embodiment mounted on the handle of a tool. The tool where the tool adapter 2 is mounted may have a battery embedded therein and may be a gun-type commercial tool. An arrow 20 of FIG. 8 indicates the front of the tool adapter 2.

As illustrated in FIG. 7, the fixing part 210 may be mounted on the handle of the tool by inserting the handle of the tool in the opening of the fixing part 210. By moving a rear side surface 211 of the fixing part 210 in a front-to-rear direction, the position of the tool may be adjusted such that the switch of the tool and the power transmission structure 230 can face each other.

Since the rear side surface 211 can be moved in the front-to-rear direction, the size of the handle of the tool that can be inserted in the fixing part 210 is not particularly limited. Therefore, the tool adapter 2 according to the present embodiment is compatible with, and mountable on, various types of tools.

A robot hand may grip the grip part 220 in a left-to-right direction with respect to the front of the tool adapter 2. The robot hand that grips the tool adapter 2 according to the present embodiment may preferably, but not necessarily, be a robot hand with at least two fingers. For example, the robot hand may include a set of parallel tongs with two parallel fingers or a set of angled tongs with two fingers that form an acute angle.

Outer side surfaces of the grip part 220 that are to be gripped by the robot hand may be formed of a material having a friction force, such as, for example, a rubber material, so that the robot hand does not slip thereon. According to an embodiment, in a case where one or more protrusions are formed on the tongs of the robot hand, at least one recess or hole may be formed on the outer side surfaces of the grip part 220 to be gripped by the robot hand to correspond to the shape of the protrusions. Alternatively, in a case where one or more recesses or holes are formed on the tongs of the robot hand, at least one protrusion may be formed on the outer side surfaces of the grip part 220 to be gripped by the robot hand to correspond to the shape of the recesses or holes.

The tool adapter 2 according to the present embodiment presses the switch of the tool with the use of an external force. The external force is a force with which an object pushes the tool away in response to the tool pressing the object. If the robot hand that grips the tool adapter 2 with the tool mounted thereon moves toward the object so that the action point of the tool presses the object, the object pushes the tool away in reaction. The tool adapter operates the tool by transmitting the external force, with which the object pushes the tool away as the robot hand moves, to the switch of the tool.

Operating principles of the power transmission structure 130 will be described later with reference to FIGS. 9 and 10.

Figure 9:
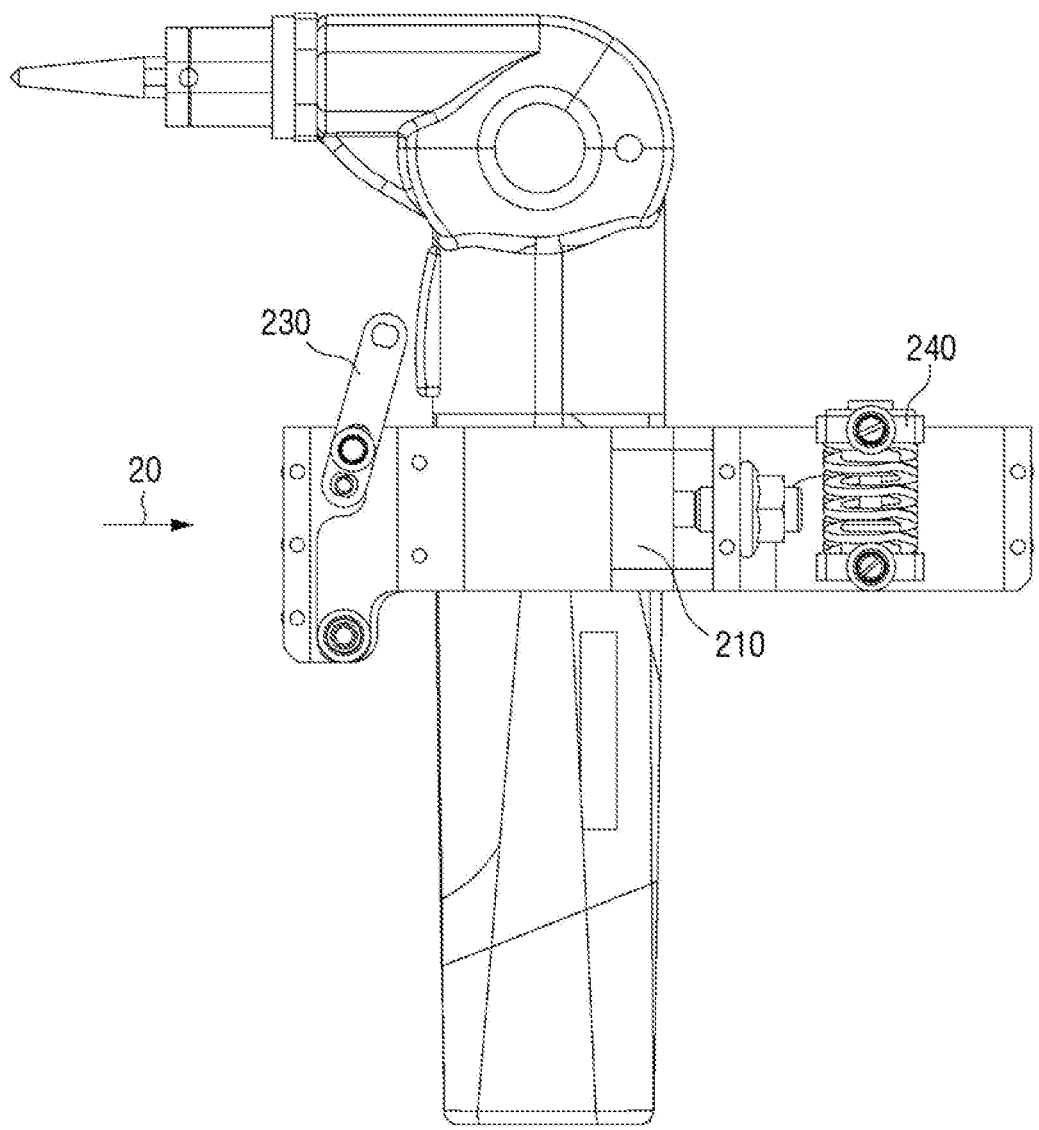
FIG. 9 is a side view illustrating a tool adapter with an external force yet to be applied thereto, according to an embodiment.
Figure 10:
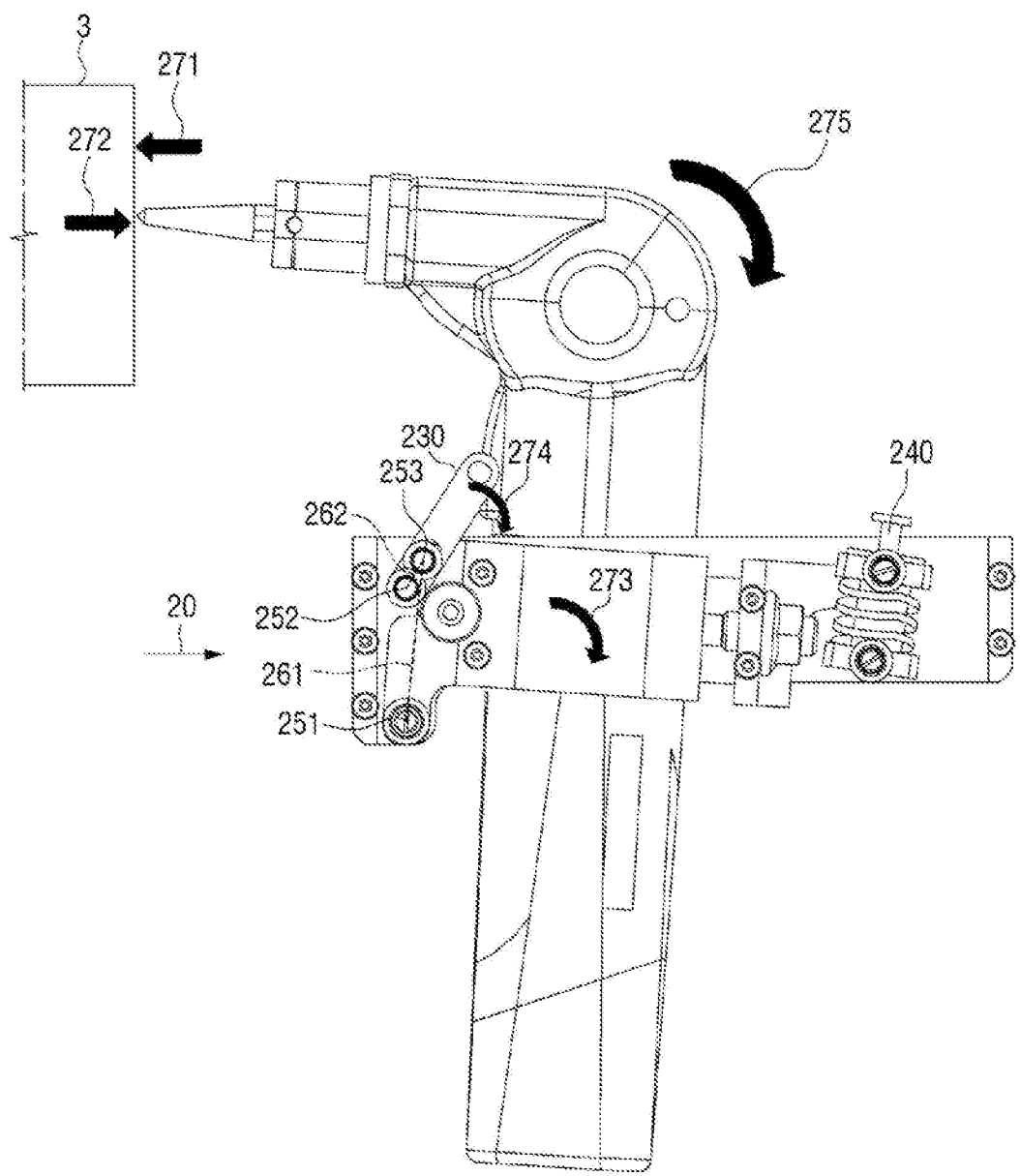
FIG. 10 is a side view illustrating a tool adapter to which an external force is being applied, according to an embodiment.

FIGS. 9 and 10 are side views illustrating the tool adapter 2, according to an embodiment, mounted on the handle of a tool. Specifically, FIG. 9 is a side view illustrating the tool adapter 2 with an external force yet to be applied thereto, and FIG. 10 is a side view illustrating the tool adapter 2 to which an external force is being applied. The left side surface of the grip part 220 is illustrated transparently in FIGS. 9 and 10 to show the power transmission structure 230, the fixing part 210, and the stopper 240. An arrow 20 of FIGS. 9 and 10 indicates the front of the tool adapter 2.

Referring to FIG. 10, as a robot hand that grips the tool adapter 2 with a tool mounted thereon moves toward an object 3, a pressing force 271 with which the tool presses the object 3 is generated. Due to the pressing force 271, the object 3 applies a pushing force 272 that pushes the tool away, i.e., an external force 272, in the opposite direction to the pressing force 271.

The external force 272 is transmitted to the tool and the fixing part 210, which fixes the tool, so that the fixing part 210 rotates clockwise (273) about the first fixing pin 251 together with the tool. Referring to FIGS. 9 and 10, the fixing part 210 of FIG. 10 is rotated clockwise (273) from the fixing part 210 of FIG. 9.

As the fixing part 210 rotates about the first fixing pin 251, the power transmission structure 230, which is connected to the fixing part 210 by the connecting pin 253, rotates along with the fixing part 210. Since the power transmission structure 230 is fixed to the grip part 220 by the second fixing pin 252, the power transmission structure 230 rotates (274) about the second fixing pin 252. Referring to FIGS. 9 and 10, the power transmission structure 230 of FIG. 10 is rotated clockwise (274) to be tilted at a larger angle than the power transmission structure 230 of FIG. 9.

An angle by which the fixing part 210 rotates (273) about the first fixing pin 251 and an angle by which the power transmission structure 230 rotates (274) about the second fixing pin 252 are determined by a ratio of the distance between the first fixing pin 251 and the connecting pin 253 and the distance between the second fixing pin 252 and the connecting pin 253.

Since the distance between the first fixing pin 251 and the connecting pin 253 is greater than the distance between the second fixing pin 253 and the connecting pin 253, the power transmission structure 230 rotates by a greater angle than the fixing part 210.

Since the fixing part 210 is fixed to the handle of the tool and thus rotates (275) together with the tool, a rotation angle of the tool is the same as a rotation angle of the fixing part 210. Since the power transmission structure 230 rotates by a greater angle than the fixing part 210, the power transmission structure 230 rotates by a greater angle than the tool.

The tool and the power transmission structure 230 are both rotated by the external force 272, but the power transmission structure 230 rotates by a greater angle than the tool. Thus, the end of the power transmission structure 230 can press the switch of the tool.

According to the aforementioned operating principles, the tool adapter 2 can turn on the switch of the tool using the external force 272. Also, the tool adapter 2 can adjust operating stages of the tool by changing a distance by which the robot hand moves toward the object 3 to adjust the magnitude of the external force 272, thereby changing a force with which that the power transmission structure 230 presses the switch.

According to the aforementioned operating principles, the fixing part 210 of the tool adapter 2 rotates about the first fixing pin 251, and the stopper limits the rotation angle of the fixing part 210. The stopper 240 will hereinafter be described with reference to FIGS. 11 and 12.

Figure 11:
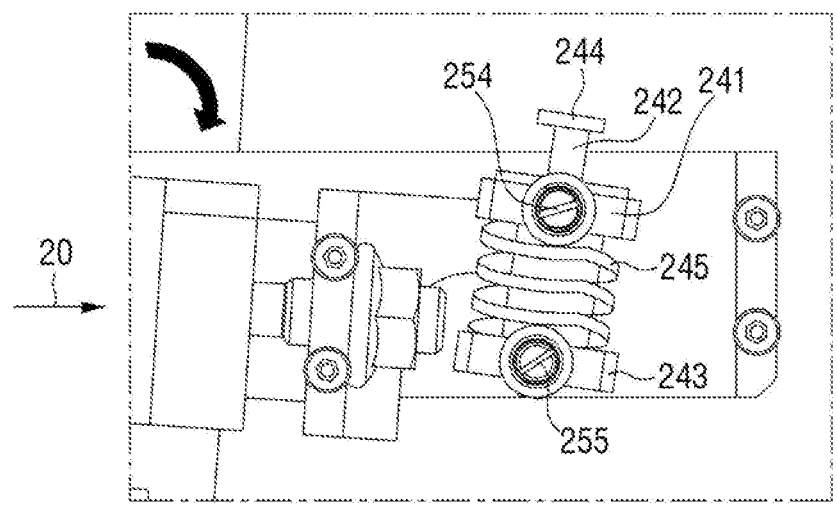
FIG. 11 is a side view illustrating a stopper with an external force applied to a tool adapter, according to an embodiment.
Figure 12:
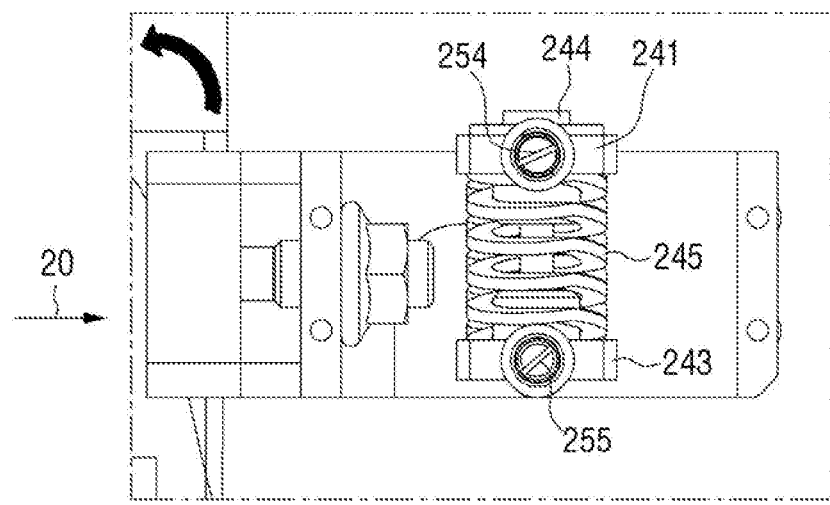
FIG. 12 is a side view illustrating a stopper with an external force removed from a tool adapter, according to an embodiment.

FIGS. 11 and 12 are side views illustrating the stopper 240 of the tool adapter 2, according to an embodiment. Specifically, FIG. 11 is a side view illustrating the stopper 240 with an external force applied to the tool adapter 2, and FIG. 12 is a side view illustrating the stopper 240 with an external force removed from the tool adapter 2. An arrow 20 of FIGS. 11 and 12 indicates the front of the tool adapter 2.

Referring to FIG. 11, in a case where the fixing part 210 is rotated by an external force, the stopper moving plate 241, which is fixed to the fixing part 210 by the third fixing pin 254, moves along a rotation radius of the fixing part 210. A trajectory of the stopper moving plate 241 forms a convex arc in a rearward direction. The stopper fixed plate 243 is fixed to the grip part 220 by the fourth fixing pin 255. Thus, as the stopper moving plate 241 moves along the arc, the stopper central shaft 242 rotates clockwise about the fourth fixing pin 255, and the stopper moving plate 241 descends along the stopper central shaft 242.

Since the stopper fixed plate 243 is fixed to the grip part 220 by the fourth fixing pin 255, a length by which the stopper moving plate 241 descends toward the stopper fixed plate 243 is limited. Since the stopper moving plate 241 is fixed to the fixing part 210 by the third fixing pin 254, the maximum rotation angle of the fixing part 210 is limited because the length by which the stopper moving plate 241 descends is limited.

Referring to FIG. 12, the stopper central shaft 242 is surrounded by a spring. As an external force disappears, the stopper moving plate 241 may return to its initial position due to the spring.

As an external force disappears, the stopper moving plate 241 ascends due to the restoring force of the spring. Since a stopper protrusion 244 is formed at the top of the stopper central shaft 242, a length by which the stopper moving plate 241 ascends is limited.

Since the fixing part 210 is fixed to the stopper moving plate 241 by the third fixing pin 254, the length by which the stopper moving plate 241 ascends is limited, and thus, a return angle of the fixing part 210 is limited.

According to the foregoing embodiments, since the robot hand is simply supposed to grip the grip part of the tool adapter to operate the tool, no particular mechanical/electrical interface is needed between the tool adapter and the robot hand. Accordingly, a robot can replace tools itself at a remote work site by using the tool adapter of the foregoing embodiments.

Although the inventive concept has been described above in relation to the above-mentioned embodiments, the embodiments may be modified or changed in various manners without departing from the gist and scope of the disclosure. Therefore, such modifications or changes belong to the scope of the attached claims as long as the modifications or changes belong to the gist of the inventive concept.

What is claimed is:

1. A tool adapter mounted on a handle of a tool to be gripped by a robot hand, the tool adapter comprising:

a fixing part including an opening, which is formed to vertically penetrate the fixing part to surround, and fix, the handle of the tool;

a grip part including contact surfaces, which are installed on left and right sides of the fixing part to be gripped by the robot hand, wherein as at least one of the contact surfaces moves in accordance with a gripping force from the robot hand, a distance between the contact surfaces changes; and a power transmission mechanism converting a movement of the at least one of the contact surfaces into a movement of pressing a switch installed at the handle of the tool.

2. The tool adapter of claim 1, further comprising:

a top cover disposed above the power transmission mechanism; and a bottom cover disposed below the power transmission mechanism.

3. The tool adapter of claim 1, wherein the grip part includes a first grip part, which forms a left contact surface of the fixing part, and a second grip part, which forms a right contact surface of the fixing part and is coupled to a right side of the fixing part, and as the first grip part moves toward the second grip part in accordance with the gripping force from the robot hand, a distance between the first and second grip parts changes.

4. The tool adapter of claim 1, wherein the power transmission mechanism includes a first push rod, which transmits the gripping force, a direction changer, which converts a direction of the transmitted gripping force into a vertical direction, and a second push rod, which transmits the direction-changed gripping force to the switch.

5. The tool adapter of claim 4, wherein a wedge-type block is formed at an end of the first push rod, the direction changer includes a circular wheel, the second push rod is disposed vertically with respect to the first push rod to rotatably support the circular wheel, and when an inclined surface of the wedge-type block pushes the circular wheel while being in contact with the circular wheel, the circular wheel and the second push rod move in the vertical direction.

6. The tool adapter of claim 5, wherein as a force with which the second push rod presses the switch changes in accordance with the gripping force from the robot hand, operating stages of the tool are adjusted.

7. The tool adapter of claim 4, wherein the first push rod is coupled to one end of the first grip part, and the tool adapter further comprises a third push rod coupled to the other end of the first grip part so that the first grip part moves in parallel to the gripping force from the robot hand.

8. The tool adapter of claim 7, wherein the first, second, and third push rods are surrounded by springs and are able to return their initial positions due to the springs.

9. The tool adapter of claim 1, wherein inner side surfaces of the fixing part are formed of a filler material with a restoring force so as to be able to fix handles of various shapes of tools.

10. The tool adapter of claim 1, wherein inner side surfaces of the fixing part have a shape corresponding to a circumferential shape of the handle.

11. A tool adapter mounted on a handle of a tool to be gripped by a robot hand, the tool adapter comprising:

a fixing part including an opening, which is formed to vertically penetrate the fixing part to surround, and fix, the handle of the tool;

a power transmission mechanism coupled to the fixing part and pressing a switch of the tool by transmitting an external force that results from a movement of the robot hand to the switch of the tool; and a grip part coupled to the fixing part and the power transmission mechanism and including contact surfaces, which are to be gripped by the robot hand, wherein the fixing part and the power transmission mechanism are coupled to the grip part to be rotatable with respect to the grip part in accordance with the external force.

12. The tool adapter of claim 11, wherein front lower portions of sides of the fixing part are coupled to front lower portions of sides of the grip part by a first fixing pin so that the fixing part can rotate about the first fixing pin with respect to the grip part, and a first end of the power transmission mechanism is fixed to front upper portions of the sides of the grip part by a second fixing pin and one point between the first end and a second end of the power transmission mechanism is connected to front upper portions of the sides of the fixing part by a connecting pin so that the power transmission mechanism can rotate about the second fixing pin when the fixing part rotates about the first fixing pin.

13. The tool adapter of claim 12, wherein a distance between the first fixing pin and the connecting pin is greater than a distance between the second fixing pin and the connecting pin, and when the fixing part rotates about the first fixing pin, the power transmission mechanism rotates about the second fixing pin at a greater angle than a rotation angle of the fixing part, depending on a ratio of the distance between the first fixing pin and the connecting pin and the distance between the second fixing pin and the connecting pin.

14. The tool adapter of claim 13, wherein the external force is a force with which an object pushes the tool away in response to the robot hand moving toward the object so that the tool presses the object.

15. The tool adapter of claim 14, wherein as a magnitude of the external force changes in accordance with the movement of the robot hand, rotation angles of the fixing part and the power transmission mechanism change, a force with which the power transmission mechanism presses the switch changes, and as a result, operating stages of the tool can be adjusted.

16. The tool adapter of claim 14, further comprising:

a stopper limiting a maximum rotation angle of the fixing part and a return angle of the fixing part when the external force is removed.

17. The tool adapter of claim 16, wherein the stopper is surrounded by a spring, and the fixing part returns to its initial position due to the spring.

18. The tool adapter of claim 11, wherein the tool is a gun-type commercial tool with a battery embedded therein.

19. The tool adapter of claim 11, wherein the contact surfaces are formed of a material with high friction.

20. The tool adapter of claim 11, wherein at least one hole is formed on the contact surfaces to correspond to protrusions at robot tongs.

* * * * *